United States Patent [19]

Gross

[11] 4,326,260

[45] Apr. 20, 1982

[54] LINEAR PIECEWISE WAVEFORM GENERATOR FOR AN ELECTRONIC MUSICAL INSTRUMENT

[75] Inventor: Glenn M. Gross, Chicago, Ill.

[73] Assignee: Norlin Industries, Inc., White Plains, N.Y.

[21] Appl. No.: 166,237

[22] Filed: Jul. 7, 1980

[51] Int. Cl.[3] .............................................. G06F 1/02

[52] U.S. Cl. .................................................. 364/718

[58] Field of Search ............... 364/718, 719, 720, 721, 364/722; 328/14; 84/1.01

[56] References Cited

U.S. PATENT DOCUMENTS

| | | | |
|---|---|---|---|
| 3,515,792 | 6/1970 | Deutsch | 84/1.03 |
| 3,763,364 | 10/1973 | Deutsch et al. | 364/718 |
| 3,824,559 | 7/1974 | Grundy | 364/718 X |
| 3,962,573 | 6/1976 | Staley | 364/718 X |
| 4,001,555 | 1/1977 | Levis et al. | 364/718 X |
| 4,130,876 | 12/1978 | Mitsuhashi | 364/721 |
| 4,225,936 | 9/1980 | Lesche | 364/718 |

OTHER PUBLICATIONS

Schilling and Belove, *Electronic Circuits: Discrete and Integrated,* McGraw-Hill, Inc., 1968, pp. 42-50.

*Primary Examiner*—David H. Malzahn

*Attorney, Agent, or Firm*—Ronald J. Kransdorf; Jack Kail

[57] ABSTRACT

A waveform generator for an electronic musical instrument comprises a signal generator (10) developing a binary signal sequentially increasing and decreasing in value at a selected rate and a memory (26) storing a plurality of parameter instructions at respective memory addresses, each memory address corresponding to a continuous group of values of the binary signal. An addressing circuit (24) addresses each memory address in response to the binary signal assuming a value within the group of values corresponding thereto. The binary signal is processed with the addressed parameter instructions in an arithmetic circuit (22,40) for developing a linear piecewise approximation of a desired waveform signal.

10 Claims, 14 Drawing Figures

| SEGMENT | BREAK POINT | OFFSET | MULTIPLIER | ADD-SUB |
| --- | --- | --- | --- | --- |
| A | 0000 | 0000 | 1.250 | 1 |
| B | 0816 | 0204 | 1.000 | 1 |
| C | 1247 | 0511 | 0.750 | 1 |
| D | 1464 | 1087 | 0.375 | 1 |
| E | 1856 | 1539 | 0.125 | 1 |

FIG. 6
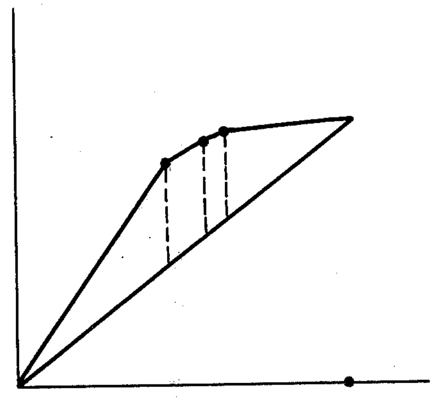
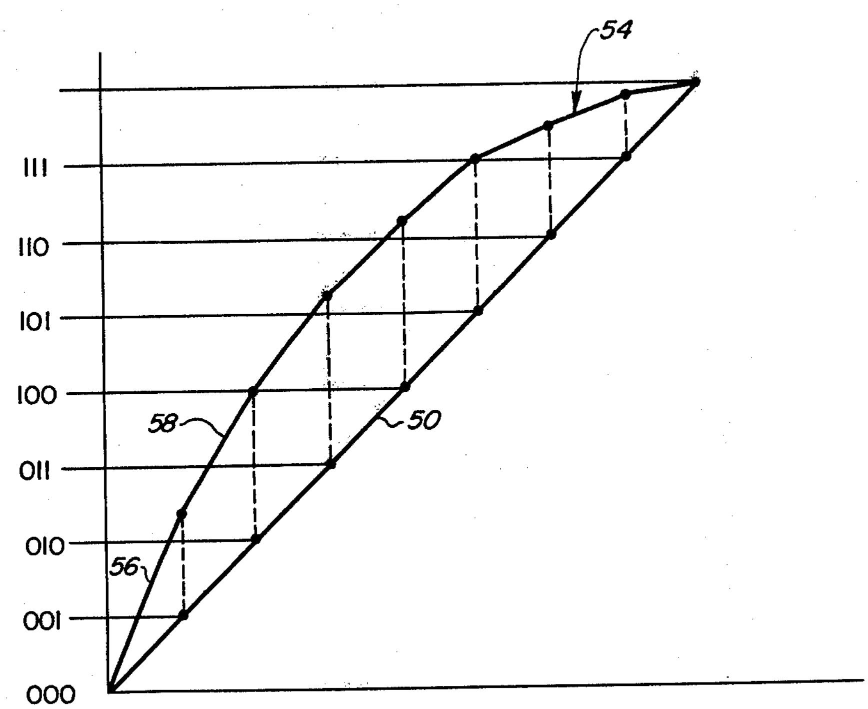
FIG. 8

LINEAR PIECEWISE WAVEFORM GENERATOR FOR AN ELECTRONIC MUSICAL INSTRUMENT

BACKGROUND OF THE INVENTION

The present invention relates to digital waveform generating apparatus and, more particularly to a digital waveform generator capable of producing a desired waveshape signal, such as a musical signal waveform, by converting a linearly ascending or descending binary signal for synthesizing a linear piecewise approximation of the desired waveform.

Electronic musical instruments utilizing apparatus for digitally generating a desired musical waveform signal are well known in the art. In one typical embodiment of such a musical instrument, a musical waveform signal is stored in a digital memory in amplitude sampled form and read out of the memory at a selected rate in response to a suitably clocked address counter. The binary waveform signal read from the memory is then converted to an analog form by a digital-to-analog converter and coupled to a speaker system for producing a musical note having a waveshape corresponding to that stored in the memory. U.S. Pat. No. 3,515,792 to Deutsch is exemplary of waveform generation systems of this general type. Although this approach provides considerable flexibility in generating musical waveform signals, in that it permits any waveform to be produced by storing a representation thereof in terms of a succession of spaced amplitude samples, it is also subject to the disadvantage that excessive memory capacity is required to produce a high quality audio signal.

Another prior art technique used to digitally generate musical waveform signals employs a memory storing a set of binary instructions defining successive linear segments of a desired waveform signal. As the binary instructions are sequentially addressed, suitable calculation circuits process the binary instruction for directly generating therefrom a sequence of linear waveform segments representing the desired waveform signal. Co-pending U.S. patent application Ser. No. 88,551 filed Oct. 26, 1979, entitled Complex Waveform Generator For Musical Instrument in the name of Glenn M. Gross and assigned to the assignee of the present application is exemplary of such systems. These systems, which are typically limited to the generation of a single waveform signal at a time, necessitate the use of rather complex and costly calculation circuits especially when generating repetitive waveforms thereby somewhat reducing the utility thereof.

In yet another prior art technique, see, for example, U.S. Pat. No. 4,130,876 to Mitsuhashi, ramp signals are generated and modified through a complex series of multiplications, e.g. squaring operations, to produce a series of curved signal segments which are combined to form a desired musical waveform signal.

It is a basic object of the present invention to provide a musical waveform signal generation system which avoids the disadvantages of the prior art and which is capable of producing a wide variety of musical waveform signals without requiring the use of complex calculation circuits nor excessive memory capacity.

SUMMARY OF THE INVENTION

In accordance with the present invention, a desired musical waveform signal is digitally generated by a novel technique which contemplates the conversion of a binary signal having a sequentially increasing and/or decreasing value to a piecewise linear signal having a desired waveshape defined by a set of parameter instructions stored in a digital memory. The binary signal is relatively easy to generate and the required memory capacity is minimized since only a single stored parameter instruction is needed to define each segment of the piecewise linear waveshape signal.

More particularly, the present invention comprises means for generating a binary signal whose value sequentially increases and/or decreases to form a ramp or triangular function. A binary memory is programmed for storing a sequence of parameter instructions at a plurality of respective memory addresses, each corresponding to a group of consecutive values of the binary signal. Each stored parameter instruction comprises a set of parameter signals defining selected linear modifications of different portions of the binary signal. As the binary signal assumes a value corresponding to each of the memory addresses, the associated parameter signals are read from the memory and coupled together with the binary signal to an arithmetic circuit. The arithmetic circuit, which includes a multiplier and an adder-subtractor, linearly modifies the binary signal in accordance with the parameter signals stored at each addressed memory location for developing a linear piecewise approximation of a desired musical waveshape signal.

BRIEF DESCRIPTION OF THE DRAWINGS

FIG. 6 graphically depicts another exemplary waveform signal which may be produced by the circuit of FIG. 1.

FIG. 8 graphically depicts a waveform diagram illustrating the operation of the circuit of FIG. 7.

DESCRIPTION OF THE PREFERRED EMBODIMENT

Figure 1:
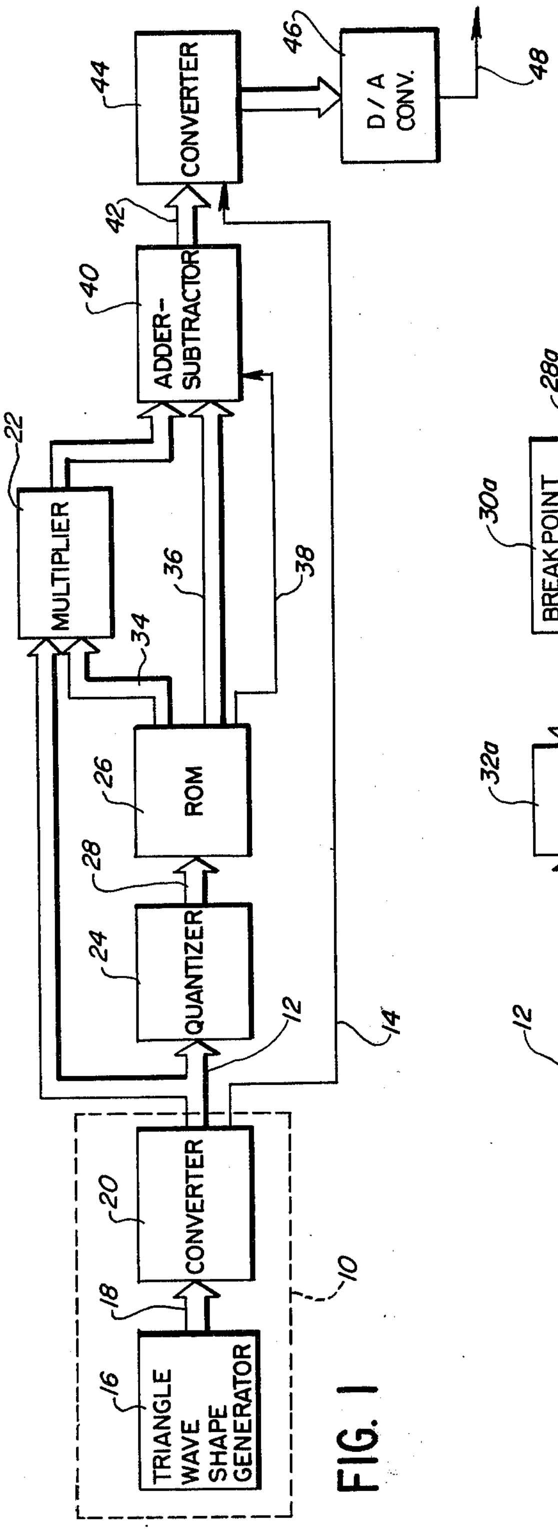
FIG. 1 is a block diagram of one embodiment of the present invention.
Figure 2:
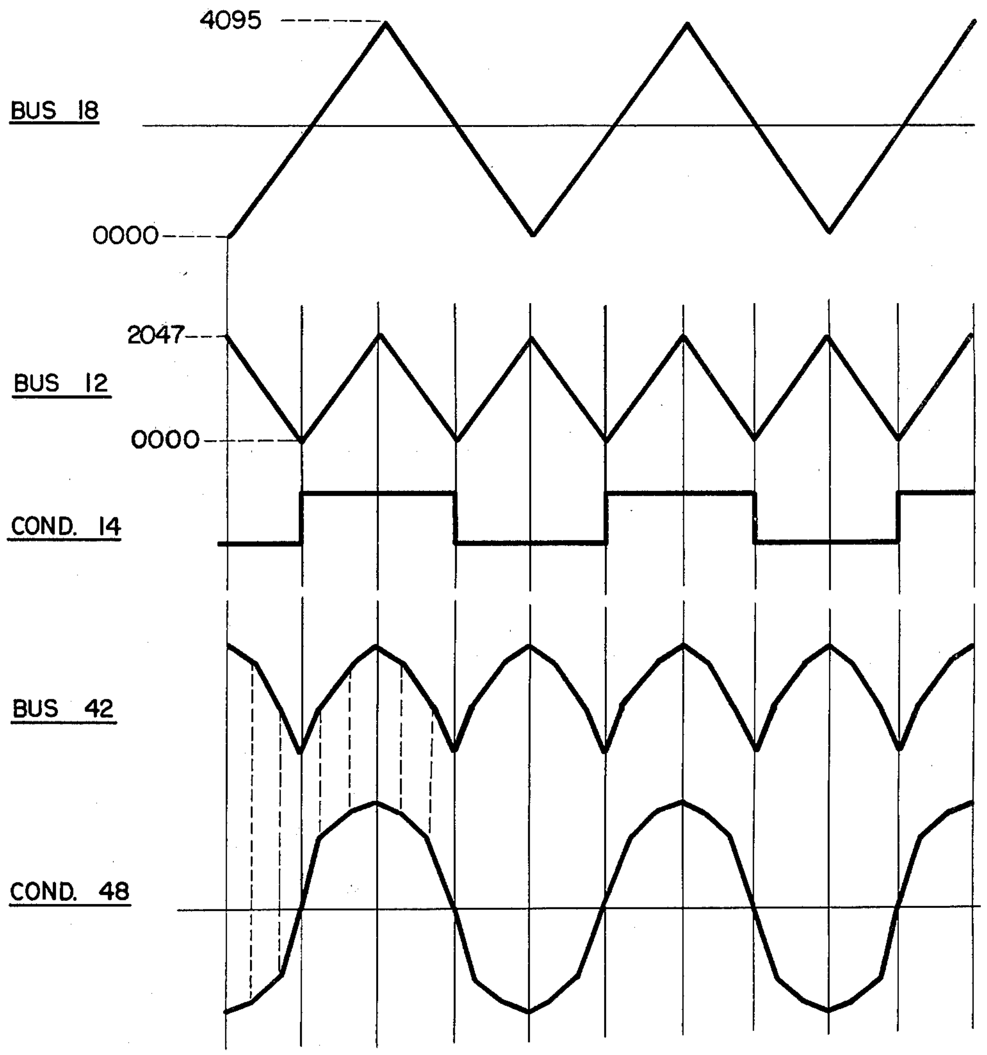
FIG. 2 graphically depicts a series of waveform diagrams illustrating the operation of the circuit of FIG. 1.

Referring now to the drawings and, in particular, to FIG. 1, a first embodiment of the digital waveform generator of the invention comprises a signal generator 10 operable for producing a binary signal representing a stepped triangle function in sign magnitude notation on an output bus 12, the sign bit defining the polarity of the binary signal produced on the bus 12 being developed on an output conductor 14. These two signals are graphically illustrated by the second and third waveforms of FIG. 2, the steps being omitted from the waveform representing the binary signal on bus 12 for purposes of clarity. Signal generator 10 comprises a triangle waveshape generator 16 which produces a binary signal representing a stepped triangle function in binary offset notation on a bus 18 as illustrated by the first waveform of FIG. 2. A converter circuit 20 is connected for converting the binary offset notation signals developed on the bus 18 to corresponding sign magnitude notation signals on output bus 12. Various circuits capable of performing the functions of triangle waveshape generator 16 and converter 20 are well known in the art, specific examples thereof being disclosed in U.S. Pat. No. 4,259,888, entitled Tone Generation System Employing Triangular Waves in the name of Glenn M. Gross and assigned to the assignee of the present application.

Figure 3:
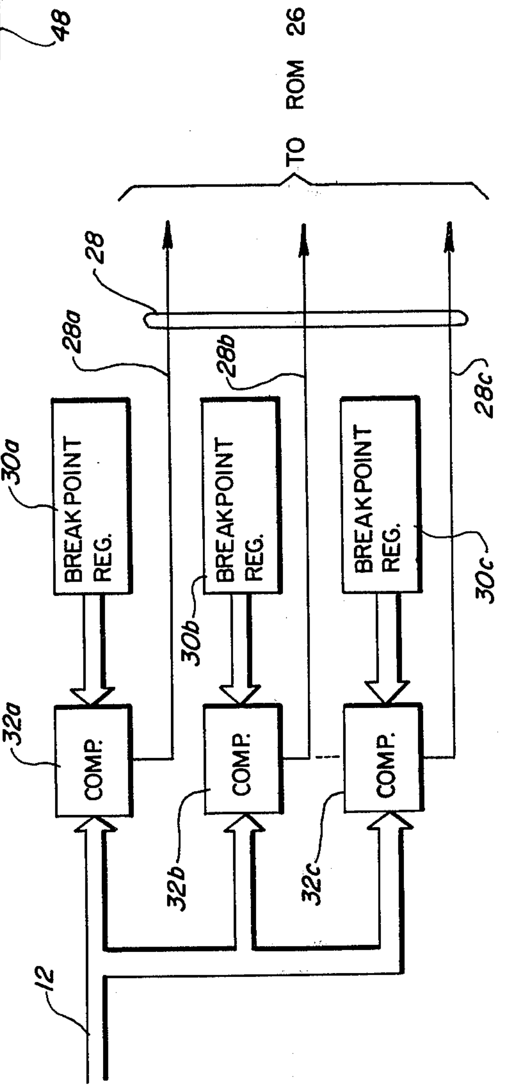
FIG. 3 is a block diagram illustrating in detail the quantizer 24 shown generally in FIG. 1.

The binary signals developed on the output bus 12 are coupled to one input of a binary multiplier 22 and also to the input of a signal quantizer 24. Quantizer 24, an embodiment of which is illustrated in FIG. 3, functions to identify different selected values of the binary signal developed on the bus 12. As will be described in further detail hereinafter, as these different values of the binary signal on bus 12 are identified, the quantizer 24 addresses different memory locations of a ROM 26 via an address bus 28.

Referring to FIG. 3, the signal quantizer 24 includes a plurality of binary signal storage elements 30*a*, 30*b* and 30*c* each storing a selected value, hereinafter referred to as a breakpoint value, of the binary signal developed on bus 12, which value corresponds to a memory address of the ROM 26. While only three such storage elements are shown in the drawing, it is contemplated that additional identically connected elements may be used. The output of each of the signal storage elements 30*a*–30*c* is coupled to one input of a respective binary comparator 32*a*, 32*b* and 32*c*, the second inputs of the comparators being supplied with the binary signal developed on the output bus 12. Each of the comparators also includes an output conductor 28*a*, 28*b* and 28*c*, together forming address bus 28, which goes logically high whenever the value of the binary signal on bus 12 is equal to or greater than the breakpoint value stored in its associated storage element 30*a*–30*c*, and is otherwise logically low. Therefore, as long as the value of the binary signal developed on bus 12 is less than each of the breakpoint values stored in the registers 30*a*–30*c*, all of the output conductors comprising bus 28 are logically low whereby the initial memory location (000) of ROM 26 is addressed. As the value of the binary signal on bus 12 increases the logical signal developed on the conductors comprising bus 28 go logically high one at a time whereby each of the corresponding memory locations of ROM 26 are addressed in a sequential manner.

Each memory location of ROM 26 is programmed for storing a selected parameter instruction which includes a first part coupled by a bus 34 to the second input of binary multiplier 22 and second and third parts coupled by a bus 36 and a conductor 38 respectively to a binary adder-subtractor circuit 40. As will be explained in further detail hereinafter, the multiplier 22 and the adder-subtractor 40 are operative for converting the binary signal developed on output bus 12 to a linear piecewise signal representing a desired musical waveform signal in accordance with the parameter instructions stored in the ROM 26. The piecewise linear waveform signal is then coupled by a bus 42 to a converter circuit 44 which reconverts the linear piecewise signal to binary offset notation and couples the converted signal through a digital-to-analog converter 46 which develops an analog representation thereof on an output conductor 48. The piecewise linear signal representing a desired musical waveform signal is represented by the fourth waveform of FIG. 2 and the representation thereof converted to binary offset notation and processed by the digital-to-analog converter 46 by the fifth waveform of FIG. 2.

Figures 4, 7:
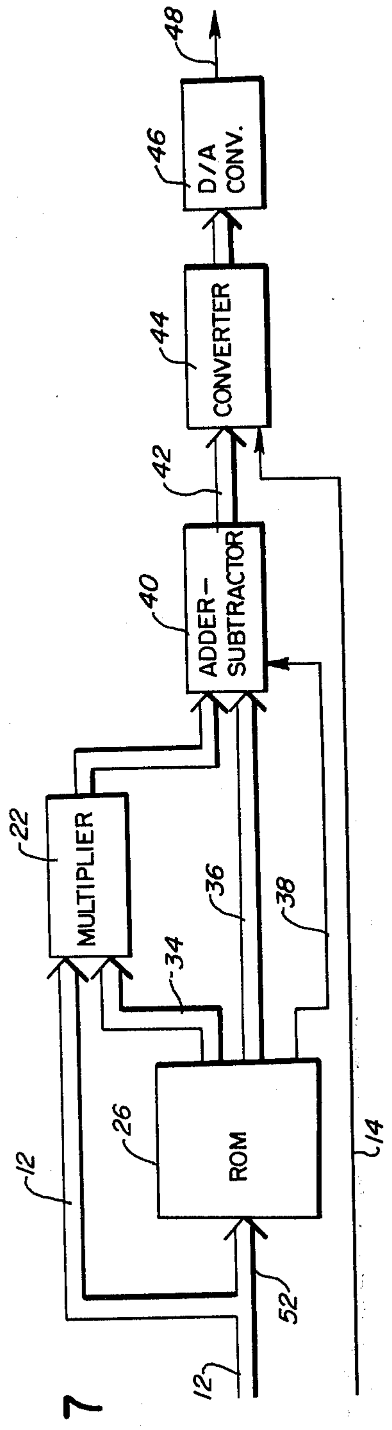
FIG. 4 is a table representing an example of the manner in which the circuit of FIG. 1 may be programmed to produce a desired waveform signal.
FIG. 7 is a block diagram illustrating another embodiment of the invention in which the quantizer 24 of FIG. 1 is eliminated.
Figure 5:
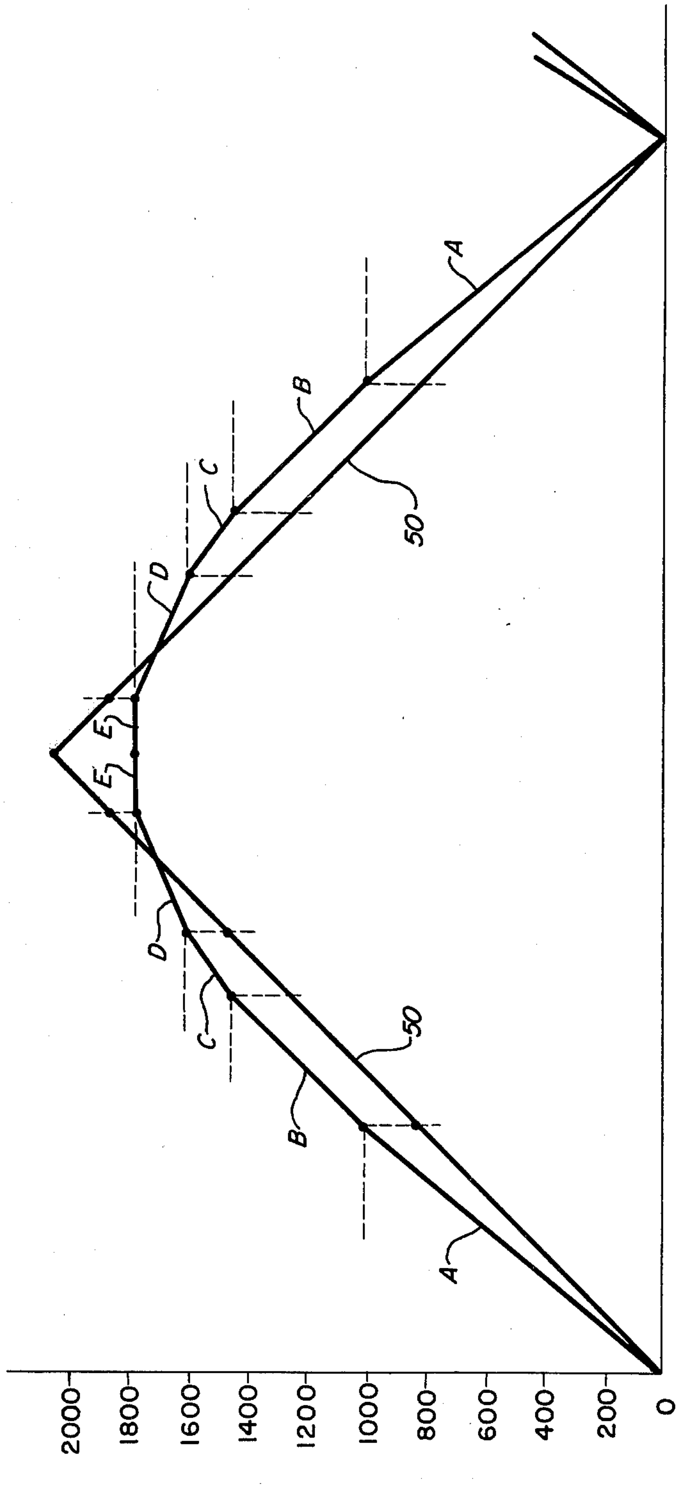
FIG. 5 graphically depicts a waveform signal produced by the circuit of FIG. 1 when programmed in accordance with the table of FIG. 4.

FIGS. 4 and 5 illustrate, in an exemplary manner, the operation of the circuit of FIG. 1 for the case where it is desired to convert the input triangle waveform on bus 12 to an output sinusoidal waveform on conductor 48. In this example, it is assumed that the binary offset notation signal developed on bus 18 consists of 12 bits so that the sign magnitude notation binary signal developed on bus 12 consists of 11 bits, the remaining bit being used to specify the signal polarity on conductor 14. The triangular signal developed on bus 12 will therefore linearly increase from a 0 value to a maximum value of 2047 and thereafter linearly decrease back to a 0 value. This triangular waveform is identified by reference numeral 50 in FIG. 5. FIG. 4 illustrates in tabular form the breakpoint values stored in the breakpoint registers, four registers being used to store the values 0816, 1247, 1464 and 1856. FIG. 4 also illustrates the corresponding parameter instruction stored in the ROM 26, each of which comprises an offset parameter signal coupled by bus 36 to one input of the adder-subtractor 40, a multiplier parameter signal coupled by bus 34 to one input of the binary multiplier 22 and a mode control signal coupled by conductor 38 to the mode control input of the adder-subtractor 40. A logical 1 mode control signal developed on conductor 38 places the adder-subtractor circuit 40 in an addition mode of operation while a logical 0 signal places the adder-subtractor circuit 40 in its subtraction mode of operation.

In operation, assume that the binary signal developed on bus 12 and represented by waveform 50 is initially at its 0 value. The output of all of the comparators 32 will therefore also be logical 0 so that the initial memory location of ROM 26 is addressed by the signal on bus 28. Accordingly, an offset parameter signal of 0000 is coupled to adder-subtractor 40 together with a logical 1 mode control signal and a multiplier parameter signal of 1.250 is coupled to the binary multiplier 22. Multiplier 22 couples the product of the multiplier parameter signal and the binary signal on bus 12 to the adder-subtractor circuit 40 which adds this product to the address offset parameter signal (0000). The identical operation is performed on each value of the binary signal up to the first breakpoint value of 0816. Consequently, a linear waveform segment A is formed having a slope somewhat steeper than the slope of waveform 50.

When the value of the binary signal on bus 12 reaches 0816, the output of the first comparator 32 goes logically high whereby the second memory location of the ROM 26 is addressed. The parameter instruction stored at the second memory location comprises an offset parameter signal of 0204, a mode control signal of logical 1 and a multiplier parameter signal of 1.000. The multiplier 22 and adder-subtractor 40 process these signals for producing a linear waveform segment B which has a slope equal to the slope of waveform 50 but which is offset therefrom by an amount equivalent to the offset parameter signal 0204. The next parameter instruction is addressed in response to the binary signal on bus 12 assuming the breakpoint value 1247. This results in the production of linear waveform segment C which is characterized by a slope slightly less than the slope of waveform 50 and includes an offset therefrom. The remaining linear waveform segments D and E are produced in an identical manner as the value of the binary signal on bus 12 increases to its maximum value of 2047. As the binary signal on bus 12 begins to decrease from the maximum value of 2047 the ROM 26 is addressed in a reverse direction whereby the linear waveform segments are formed in reverse order as shown in FIG. 5. It will be observed that the linear waveform segments produced as just described on bus 42 comprise a linear piecewise approximation of $\frac{1}{2}$ cycle of a sinusoidal waveform. This halfcycle linear piecewise approximation signal is repetitively formed in response to each triangular segment of the binary signal on bus 12 (see FIG. 2) and is reconverted to binary offset notation by converter 44. The signal is then smoothed by digital-to-analog converter 46 and developed on output conductor 48, as a periodic sinusoidal signal.

The linear piecewise approximation signal illustrated in FIG. 5 is characterized by a convex inflection as a result of the adder-subtractor circuit 40 being operated in its addition mode. An analagous linear piecewise signal can be developed but with a concave inflection by operating the adder-subtractor circuit in its subtraction mode of operation. Also, various other waveforms can be approximated by selecting different breakpoint values and storing appropriate parameter instructions in the ROM 26. For example, a trapezoidal shaped linear piecewise approximation signal can easily be developed as shown in FIG. 6.

FIG. 7 illustrates an alternate embodiment of the circuit of FIG. 1 in which the quantizer 24 is eliminated. In this embodiment, the ROM 26 is addressed directly by the conductors 52 developing the three most significant bits of the binary signal developed on bus 12. Accordingly, each time the signal represented by the three most significant bits of the binary signal on bus 12 incrementally changes value the next parameter instruction stored in ROM 26 is addressed. This effect is illustrated graphically in FIG. 8 which represents the formation of a quarter cycle linear piecewise curve 54 comprising 8 individual linear segments. Each of the linear segments corresponds to a different parameter instruction stored in the ROM 26 at a memory addressing corresponding to a particular value of the 3 most significant bits of the binary signal on bus 12. When it is desired to form a linear piecewise approximation having less than 8 segments, a number of parameter instructions having adjacent memory addresses may be identically programmed. For example, the initial two segments 56 and 58 may be formed as a continuous linear segment by programming ROM 26 for storing identical parameter instructions at memory addresses 000 and 001. Other than for the method of addressing the ROM 26, the circuit of FIG. 7 operates in an identical manner to the circuit of FIG. 1.

It will be observed that the circuits of FIGS. 1 and 7 produce waveform signals in which adjacent half cycles are symmetrical. Sometimes it is desired to produce a periodic waveform signal wherein adjacent half cycles are unsymmetrical. The circuit of FIG. 9 utilizes the techniques of the present invention to produce such an unsymmetrical waveform signal.

Figure 9:
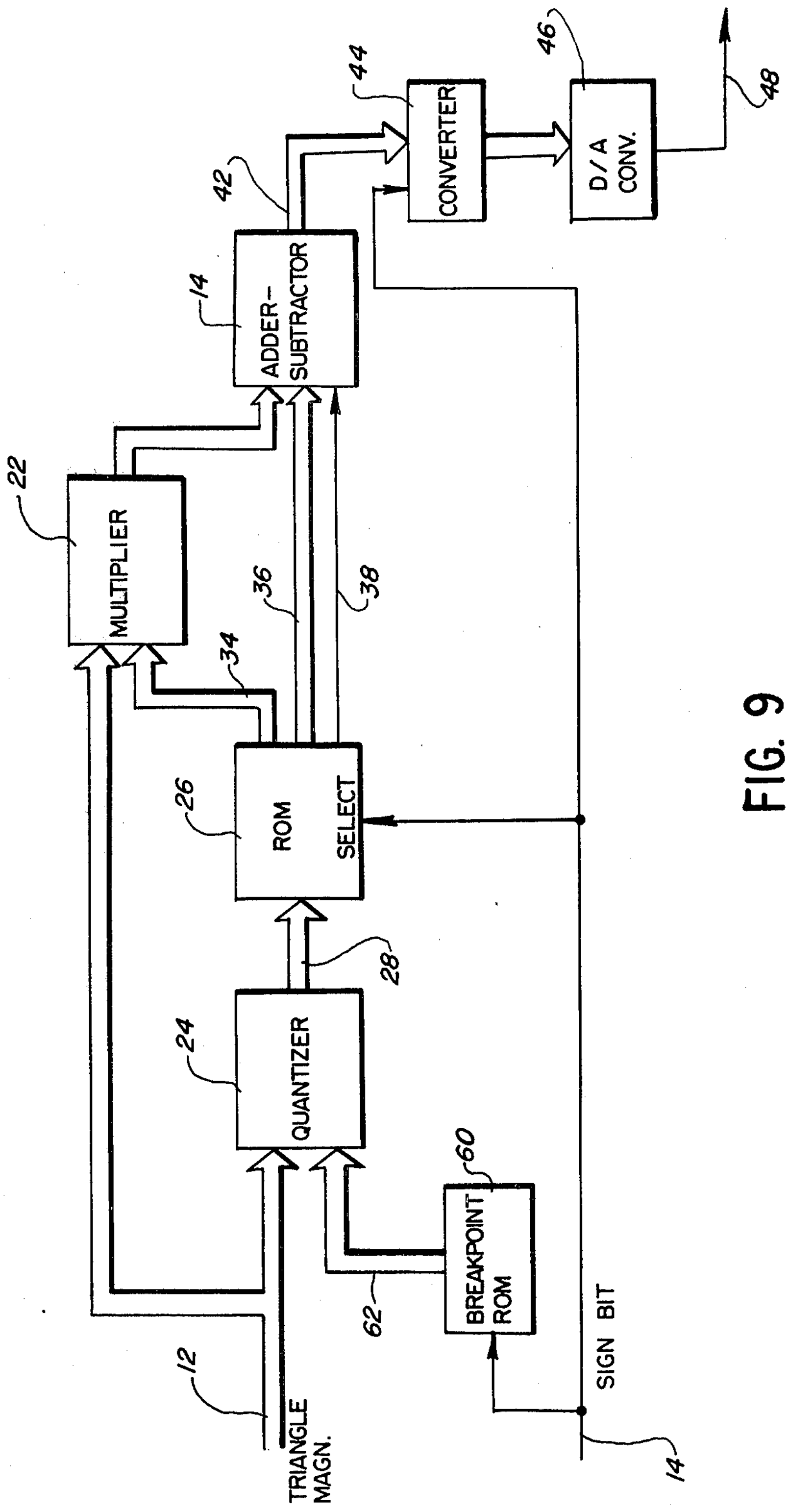
FIG. 9 is a block diagram showing another embodiment of the invention adapted for producing a waveform signal having unsymmetrical adjacent half cycles.

Referring, therefore, to FIG. 9, the sign bit developed on conductor 14, which is associated with the sign magnitude notation binary signal developed on bus 12, is coupled to the address input of a breakpoint ROM 60 and to the track select input of ROM 26. The breakpoint ROM 60 includes two memory locations each storing a different set of breakpoint values. When the sign bit developed on conductor 14 is at one logical value one of the memory locations is addressed and the corresponding breakpoint values coupled to the input of quantizer 24 via a bus 62. When the sign bit on conductor 14 assumes the opposite logical value during the next successive triangular segment of the binary signal developed on conductor 12, the second memory location is addressed and the breakpoint values stored therein are coupled over bus 62 to the input of quantizer 24. Therefore, during alternate repetitions of the triangular segments of the binary signal developed on bus 12, two sets of breakpoint values are alternately coupled to the quantizer 24.

Figure 10:
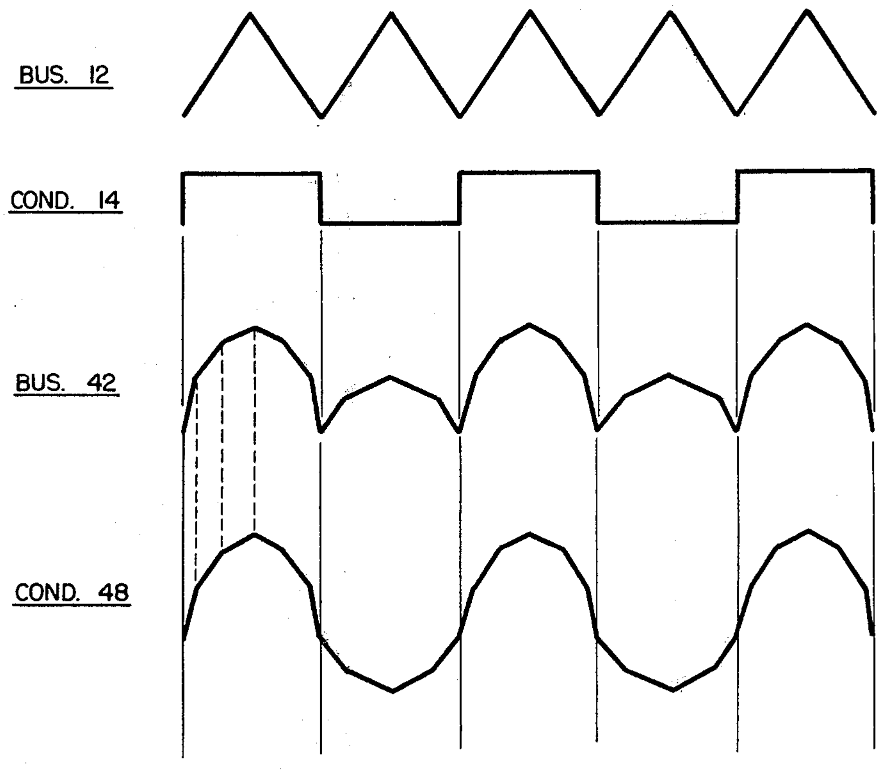
FIG. 10 graphically depicts a series of waveform diagrams illustrating the operation of the circuit of FIG. 9.

ROM 26 is programmed having two different sets of parameter instructions, each set being stored on a respective memory track of the ROM. As the sign bit on conductor 14 alternates between its two logical states, the two memory tracks of ROM 26 are alternately enabled and read from the ROM in response to address signals on bus 28. Therefore, during one of the triangular segments of the binary signal developed on bus 12 a first set of breakpoint values control quantizer 24 for addressing parameter instructions stored on one memory track of the ROM 26. During the next triangular segment of the binary signal developed on bus 12, a second set of breakpoint values control the quantizer 24 for addressing the parameter instruction stored on the second memory track of ROM 26. In this manner, a waveform signal can be developed whose adjacent half cycles are unsymmetrical as illustrated in FIG. 10. More specifically, during the intervals when the sign bit developed on conductor 44 is logical 1, a half cycle waveshape is produced having a first configuration defined by the breakpoint values stored in the first address of breakpoint ROM 60 and the parameter instructions stored on the first memory track of ROM 26. On the other hand, when the sign bit is logical 0, a half cycle waveshape is produced having a different configuration defined by the breakpoint values stored at the second address of breakpoint ROM 60 and the parameter instructions stored on the second memory track of ROM 26.

Figure 11:
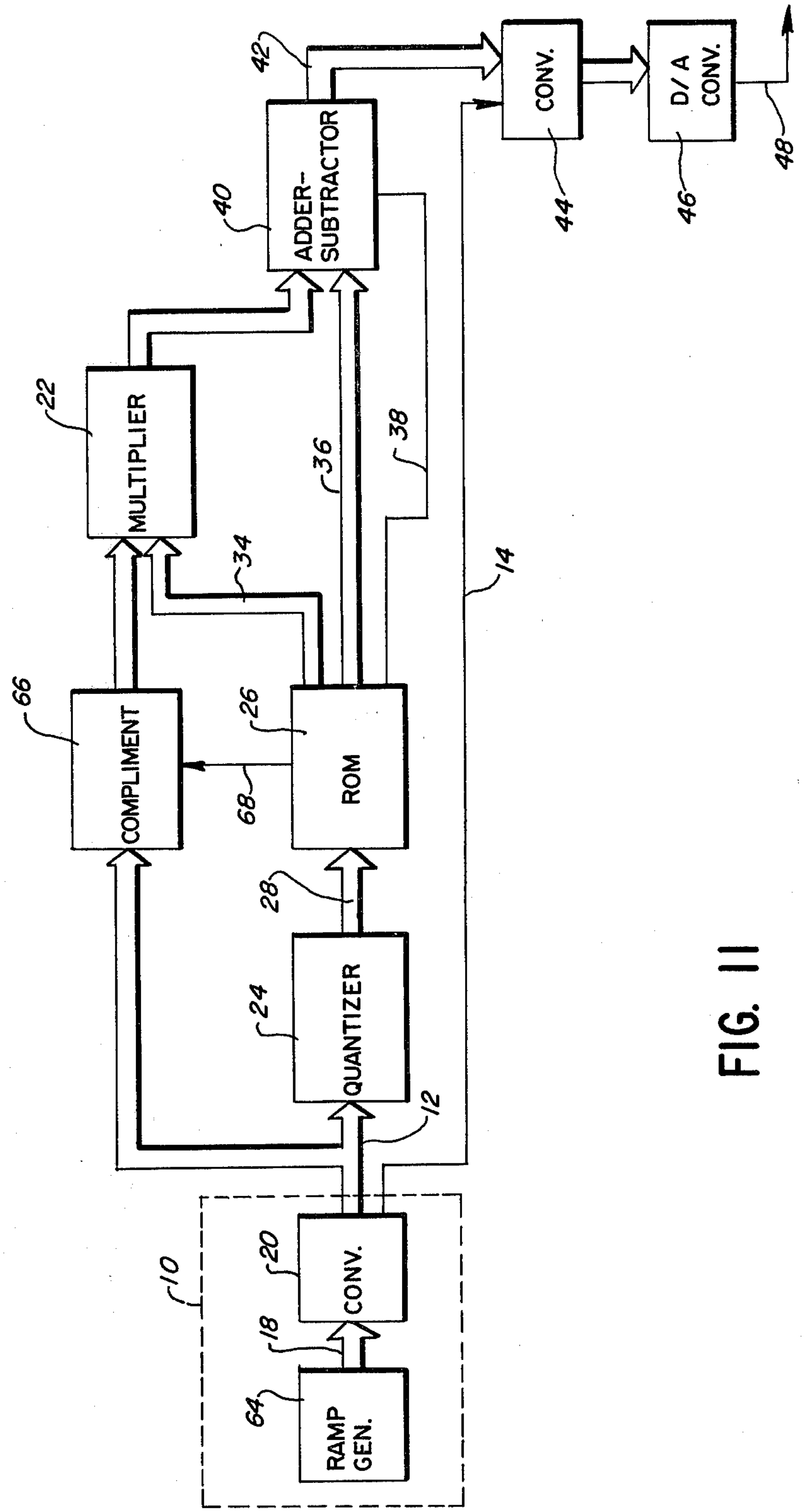
FIG. 11 is a block diagram showing an embodiment of the invention adapted for periodically producing an unsymmetrical waveform signal.

FIG. 11 illustrates another embodiment of the invention which is adapted for producing periodic waveform signals which are completely unsymmetrical. In this embodiment, the triangle waveshape generator 16 of FIG. 1 is replaced with a ramp generator 64 which couples a binary signal in binary offset notation representing a repetitive ramp function to converter 20 over bus 18. A binary signal representing a ramp function in sign magnitude notation is therefore developed on bus 12 with the associated sign bit being developed on conductor 14. The remainder of the circuit is essentially the same as that shown in FIG. 1 except that a binary complementor 66 is interposed between the output of converter 20 and the input of multiplier 22. Also, each parameter instruction stored in ROM 26 includes a bit which is coupled by a conductor 68 to the control input of complementor 66 for selectively controlling the operation thereof. In particular, the development of a logical one bit on conductor 68 operates the complementor 66 for complementing the binary signal developed on bus 12 while the development of a logical 0 signal on conductor 68 results in the binary signal developed on bus 12 being coupled directly to the multiplier 22 in an unmodified form.

Depending upon the logical states of the mode control signals associated with a particular set of parameter instructions developed on conductors 38 and 68, the ramp function developed on output bus 12 can be converted into a linear piecewise signal on conductor 48 approximating a wide variety of waveform signals. In general, whenever the slope of the desired waveform has the same polarity as the slope of the ramp function, the associated parameter instructions should be programmed for causing conductor 68 to assume a logical 0 state whereby the ramp function is coupled to the multiplier 22 in an unmodified form. On the other hand, when the slope of the desired waveform has a polarity opposite that of the ramp function, the associated parameter instructions should be programmed for causing conductor 68 to assume a logical 1 state whereby the complement of the ramp function is coupled to the multiplier 22. In either case, the mode control signals developed on conductor 38 are appropriately chosen for operating the circuit 40 in its addition or subtraction mode depending upon the specific characteristics of the desired waveform signal.

Figure 12:
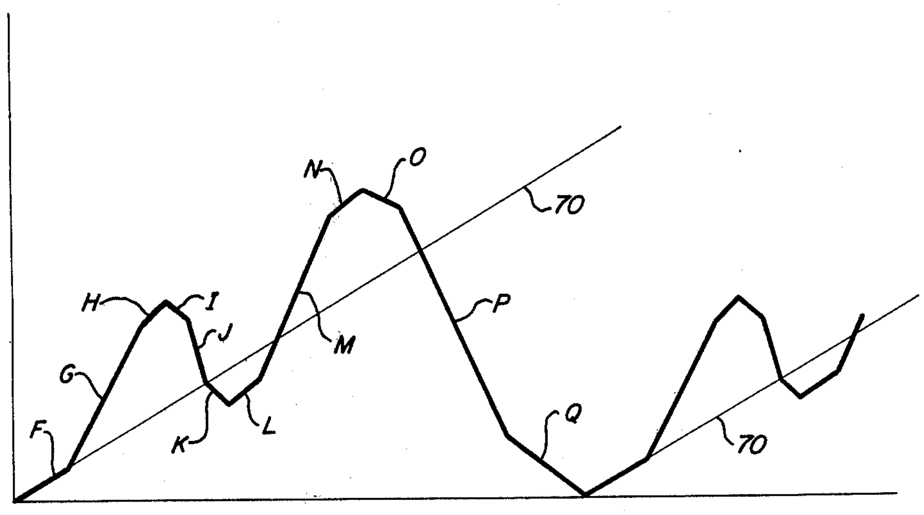
FIG. 12 graphically depicts a waveform diagram illustrating the operation of the circuit of FIG. 11.

FIG. 12 illustrates the formation of an unsymmetrical waveform signal utilizing the effects described above, the waveform signal being superimposed on a ramp function 70. The waveform signal initially comprises linear segments F, G and H formed in response to parameter instructions causing conductor 68 to exhibit a logical 0 state. The next three segments I, J and K are formed in response to parameter instructions causing conductor 68 to assume a logical 1 state. For segments L, M and N conductor 68 is returned to a logical 0 state and for the final three segments O, P and Q conductor 68 is again logical 1. Each succeeding ramp function 70 will result in the development of an identical waveform signal so that the illustrated unsymmetrical waveform is periodically reproduced.

Figure 14:
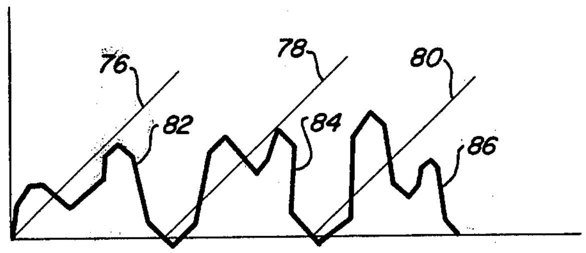
FIG. 14 graphically depicts a waveform diagram illustrating the operation of the circuit of FIG. 13.
Figure 13:
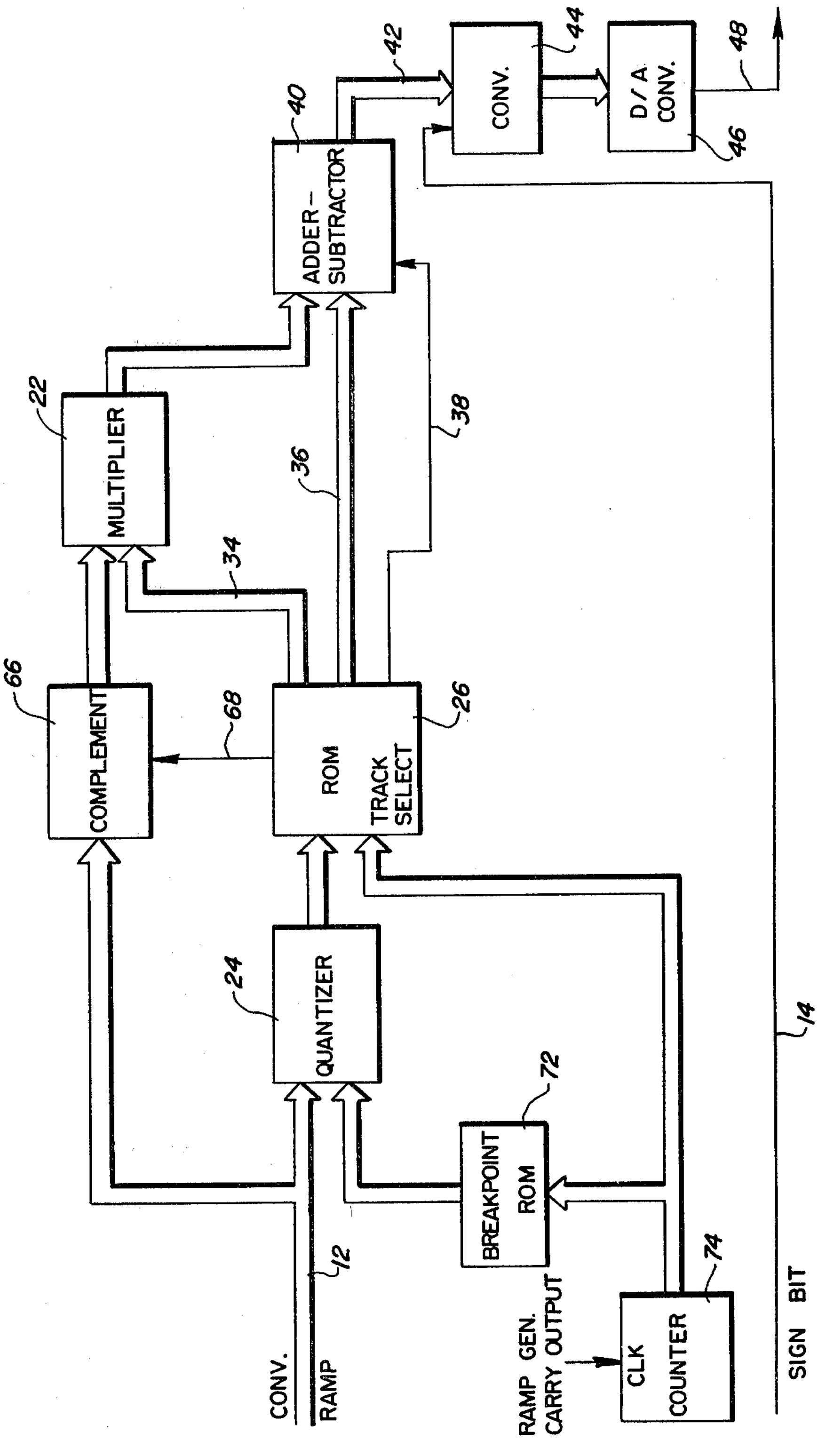
FIG. 13 is a block diagram showing an embodiment of the invention adapted for producing an unsymmetrical waveform signal which varies from cycle to cycle.

A final embodiment of the invention is illustrated in FIG. 13. This circuit is similar to the circuit of FIG. 11 except that it includes the capability of producing an unsymmetrical waveform which varies from cycle to cycle as shown in FIG. 14. Referring to FIG. 13 in more detail, the output of a counter 74, which is clocked in response to the carry output of ramp generator 64, is coupled to the address input of a breakpoint ROM 72 and to the track select input of ROM 26. Breakpoint ROM 72 stores a plurality of different sets of breakpoint values, the sets of stored breakpoint values being sequentially addressed as the output of the counter 74 is incremented. ROM 26 includes a plurality of tracks each storing a set of parameter instructions, the different tracks also being enabled in response to the output of the counter 74. With reference to FIG. 14, the counter 74 is in its initial state during the production of ramp 76 whereby a first set of breakpoint values stored in ROM 72 are addressed and a first track of ROM 26 is enabled. This results in quantizer 24 operating ROM 26 for producing a linear piecewise waveform 82 corresponding to the first set of breakpoint values and to the parameter instruction stored on the first track of ROM 26.

After the completion of ramp 76, counter 74 is clocked whereby the next set of breakpoint values in ROM 72 are addressed and the next track of ROM 26 is enabled. In response thereto, a different linear piecewise curve 84 is developed. In a similar fashion, a linear piecewise curve 86 is developed in response to ramp 80 and so on. It will be appreciated that the foregoing technique of producing a waveform signal whose characteristics vary from cycle to cycle could also be employed in the other embodiments of the invention described herein. In addition, the technique of FIG. 7 for eliminating the quantizer 24 could also be incorporated into the circuit of FIG. 13 as well as into the various other embodiments of the invention.

While particular embodiments of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A digital waveform generator comprising:

means for developing a binary signal sequentially changing in value at a selected rate;

memory means storing each of a plurality of parameter instructions at a respective memory address, each of said respective memory addresses corresponding to a continuous group of values of said binary signal;

means for addressing each of said respective memory addresses in response to said binary signal assuming a value within the group of values corresponding thereto; and output means for modifying said binary signal in accordance with said addressed parameter instructions for developing a desired output waveform signal.

2. A digital waveform generator according to claim 1 wherein said memory means comprises means for storing each of said parameter instructions in the form of first and second binary parameter signals, said output means comprising means for developing a product signal representing the product of said binary signal and the first parameter signal of the currently addressed parameter instruction and arithmetic means responsive to said product signal and to the second binary parameter signal of the currently addressed parameter instruction for developing said output waveform signal.

3. A digital waveform generator according to claim 2 wherein each of said stored parameter instructions further comprises a third binary parameter signal, said arithmetic means being selectively operable in response to the third binary parameter signal of the currently addressed parameter instruction for operation in an addition or a subtraction mode for developing said output waveform signal.

4. A digital waveform generator according to claim 1 wherein said means for addressing comprises means storing a plurality of binary breakpoint signals each defining a respective one of said groups of values of said binary signal and means comparing each of said stored breakpoint signals with said binary signal for addressing the memory address corresponding to the group defined by the breakpoint signal yielding the last equality comparison.

5. A digital waveform generator according to claim 1 wherein said means for addressing comprises means coupling a predetermined number of the most significant bits of said binary signal for addressing said memory means.

6. A digital waveform generator comprising:

means for developing a binary signal sequentially increasing in value;

memory means storing each of a plurality of parameter instructions at a respective memory address corresponding to a continuous group of values of said binary signal, each of said parameter instructions comprising first and second parts;

means for addressing each respective one of said memory addresses in response to said binary signal assuming a value within the group of values corresponding thereto;

means responsive to said first part of the currently addressed parameter instruction for selectively complementing said binary signal; and output means responsive to said selectively complemented binary signal and to the second parts of said addressed parameter instructions for developing an unsymmetrical output waveform signal.

7. A digital waveform generator comprising:

means for developing a binary signal representing a triangular waveform comprising a continuous succession of triangular segments;

memory means storing each of a plurality of first parameter instructions at a respective memory address of a first memory track, each of said memory addresses of said first track corresponding to a continuous group of values of said binary signal;

means for addressing each of said respective memory addresses in response to said binary signal assuming a value within the group of values corresponding thereto; and output means for linearly modifying said binary signal in accordance with said addressed first parameter instructions for developing a desired periodic output waveform signal having symmetrical adjacent half cycles.

8. A digital waveform generator comprising:

means for repetitively developing a binary signal sequentially increasing in value;

memory means storing each of a plurality of parameter instructions at a respective memory address corresponding to a continuous group of values of said binary signal, each of said parameter instructions comprising first and second parts;

means for addressing each respective one of said memory addresses in response to said binary signal assuming a value within the group of values corresponding thereto;

means responsive to said first part of the currently addressed parameter instruction for selectively complementing said binary signal; and output means responsive to said selectively complemented binary signal and to the second parts of said addressed parameter instructions for developing an unsymmetrical output waveform signal.

9. A digital waveform generator according to claim 8 wherein said memory means comprises means for storing a plurality of said parameter instructions on each of a plurality of enableable memory tracks and including means for enabling a different one of said memory tracks each time said binary signal completes one repetition.

10. A digital waveform generator comprising:

means for developing a binary signal representing a triangular waveform comprising a continuous succession of triangular segments;

memory means comprising first and second memory tracks, said first memory track storing each of a plurality of first parameter instructions at a respective memory address and said second memory track storing each of a plurality of second parameter instructions at a respective memory address, each of said memory addresses of said first and second memory tracks corresponding to a continuous group of values of said binary signal;

means alternately enabling said first and second memory tracks in response to successive ones of said triangular segments;

addressing means alternately operable in response to successive ones of said triangular segments for addressing the respective memory addresses of said first and second tracks for alternately developing said first and second pluralities of parameter instructions during successive ones of said triangular segments; and output means responsive to said binary signal and to said alternately developed pluralities of first and second parameter instructions for developing a desired periodic output waveform signal having unsymmetrical adjacent half cycles.

* * * * *